United States Patent
Worthy

(10) Patent No.: US 6,813,475 B1
(45) Date of Patent: Nov. 2, 2004

(54) INTERFERENCE ATTENUATING REMOTE AUDIENCE SURVEY SYSTEM AND METHOD

(76) Inventor: David G. Worthy, 819 E. Vaughn, Gilbert, AZ (US) 85234

( * ) Notice: Subject to any disclaimer, the term of this patent is extended or adjusted under 35 U.S.C. 154(b) by 671 days.

(21) Appl. No.: 09/709,878

(22) Filed: Nov. 9, 2000

(51) Int. Cl.⁷ .............................................. H04B 17/00
(52) U.S. Cl. ...................... 455/2.01; 455/3.06; 455/26.1
(58) Field of Search ............................... 455/2.01, 3.01, 455/26.1, 80.1; 348/1, 2; 725/9, 10, 11, 13, 14, 15, 16, 18, 22

(56) References Cited

U.S. PATENT DOCUMENTS

| | | | |
|---|---|---|---|
| 3,434,150 A | 3/1969 | Wernlund et al. ............... | 346/1 |
| 4,577,220 A | 3/1986 | Laxton et al. ................. | 358/84 |
| 4,599,644 A | 7/1986 | Fischer ......................... | 358/84 |
| 4,618,995 A | 10/1986 | Kemp ............................ | 455/2 |
| 4,847,685 A * | 7/1989 | Gall et al. ..................... | 725/14 |
| 4,930,011 A * | 5/1990 | Kiewit .......................... | 725/10 |
| 4,955,070 A | 9/1990 | Welsh et al. .................... | 455/2 |
| 5,235,414 A * | 8/1993 | Cohen ........................... | 725/13 |
| 5,410,724 A | 4/1995 | Worthy .......................... | 455/2 |
| 5,561,835 A | 10/1996 | Worthy .......................... | 455/2 |
| 5,572,450 A * | 11/1996 | Worthy .......................... | 702/85 |
| 5,749,043 A | 5/1998 | Worthy .......................... | 455/2 |
| 5,819,155 A | 10/1998 | Worthy et al. .................. | 455/2 |
| 5,839,050 A * | 11/1998 | Baehr et al. ............... | 455/2.01 |
| 6,288,676 B1 * | 9/2001 | Maloney ..................... | 342/457 |

FOREIGN PATENT DOCUMENTS

WO     WO 95/23980    *   2/1995

* cited by examiner

Primary Examiner—Tilahun Gesesse
(74) Attorney, Agent, or Firm—Meschkow & Gresham, P.L.C.

(57) ABSTRACT

An interference attenuating remote audience survey system (42) is configured to identify radio stations (84) to which tuners (26) are tuned, the tuners (26) having local oscillator (LO) signals (30) emitted therefrom. The system (42) includes a first antenna (34) for sensing a first signal (52) at a selected LO frequency (88), the first signal (52) including one of the LO signals (30) and an interference signal (96). A second antenna (44) receives a second signal (54) at the selected LO frequency (88), the second signal (54) including an interference signal (100). A shield element (48) shields the second antenna (44) from receiving the one of the LO signals (30). The first and second signals (52, 54) are subtractively combined to produce a third signal (77), the interference signal (96) being attenuated from the third signal (77). A receiver (64) is configured to detect the one of the LO signals (30) within the third signal (77) to determine that one of the tuners (26) is tuned to the one of the radio stations (84) associated with the detected LO signal (30).

22 Claims, 8 Drawing Sheets

TUNING TABLE

| CALL LETTERS | STATION FREQ. | LO FREQ. | PHASE SHIFT COMPONENT (V) | AMPLITUDE COMPONENT (V) |
|---|---|---|---|---|
| KABC | 88.1 | 98.8 | X | Y |
| KDEF | 91.7 | 102.4 | ... | ... |
| ... | ... | ... | | |
| KXYZ | 107.9 | 118.6 | | |

FIG. 5

| STATION FREQ. | DESCRIPTIVE DATA | DATE | TIME | START TIME | END TIME | SIGNAL STRENGTH |

INTERFERENCE ATTENUATING REMOTE AUDIENCE SURVEY SYSTEM AND METHOD

TECHNICAL FIELD OF THE INVENTION

The present invention relates generally to identifying broadcast stations to which tuners are tuned. More specifically, the present invention relates to attenuating interference when identifying, from a remote location, the broadcast stations to which tuners are tuned.

BACKGROUND OF THE INVENTION

The commercial broadcast industry and businesses which advertise through the radio frequency (RF) broadcast media need to know the sizes of audiences which are tuned to particular stations relative to other stations at particular times. This need has been met primarily through the use of verbal or written audience participation surveys. With respect to radio a majority of the listening occurs in automobiles. A problem with written surveys is that listeners cannot practically make a record of their listening tendencies while driving.

In order to make a record of listening tendencies while driving, electronic RF monitoring equipment has been used to remotely identify the stations to which tuners may be tuned. Generally speaking, audiences' radio tuners use predetermined signals, such as local oscillator signals, that are related to the frequencies of the respective radio stations currently being tuned in. The local oscillator signals are broadcast or otherwise emitted from the tuners as very weak signals that sensitive monitoring equipment can detect. The monitoring equipment identifies the radio stations to which tuners are tuned by detecting these local oscillator signals.

This remote monitoring technique is desirable because it does not require cooperation from an audience, hence reducing or eliminating a host of inaccuracies and costs associated with audience participation surveys. Furthermore, large sample sizes may be monitored at low cost relative to audience participation survey techniques.

Typically, prior art electronic RF monitoring systems call for the local oscillator signals to be well above the level of background electronic noise in the area at which the remote monitoring is to occur. One primary source of background electronic noise, or interference, is from the radio stations themselves because the radio stations broadcast near in frequency to the desired local oscillator signal, and with much higher power.

The background electronic noise may cause local oscillator signals at some frequencies to be more readily detectable than at other frequencies leading to station bias in favor of stations whose related local oscillator signals may have a lower level of background noise. One attempt to compensate for this station bias is to tune the monitoring equipment to the radio station or frequency with the lowest amount of signal to noise ratio in order to equalize the detection of the noisiest local oscillator signal with the detection of the other less noisy oscillator signals. Unfortunately, such a strategy results in the reduced sensitivity of the monitoring equipment and a reduced number of incidences that a radio station is identified, or counted, through the detection of the corresponding local oscillator signal.

In addition, conventional monitoring equipment may fail to identify some radio stations due to a weak local oscillator signal emitted from a particular tuner. As such, this weak local oscillator signal from a particular tuner may not be detectable over the background interference. Local oscillator signals that are weaker at particular tuners, but stronger at other tuners results in a reduced number of incidences that a radio station is identified through the detection of the corresponding local oscillator signal.

Prior art conventional remote monitoring systems have failed to adequately solve the problems associated with interference induced station bias without reducing the sensitivity of the monitoring equipment.

SUMMARY OF THE INVENTION

Accordingly, it is an advantage of the present invention that an interference attenuating remote audience survey system and method are provided.

Another advantage is that the present invention improves the accuracy of audience survey data.

It is another advantage that improved accuracy is achieved by improving on the ability of the system to detect audience survey data through the attenuation of interference.

Yet another advantage is that the present invention achieves a compact size through an efficient configuration.

The above and other advantages of the present invention are carried out in one form by an interference attenuating remote audience survey system for identifying radio stations to which tuners are tuned, the tuners having local oscillator (LO) signals emitted therefrom. The system includes a controller configured to select one of the LO signals associated with one of the radio stations. A first antenna senses a first signal in a detection zone of the first antenna, the first signal including the one of the LO signals and an interference signal. A second antenna receives a second signal, the second signal including the interference signal. A shield element is positioned between the second antenna and the detection zone for shielding the second antenna from receiving the one of the LO signals. A combiner is in communication with each of the first and second antennas. The combiner subtractively combines the first and second signals to produce a third signal, the interference signal being attenuated from the third signal. A receiver is in communication with the combiner and the controller. The receiver is configured to detect the selected one of the LO signals within the third signal to determine that one of the tuners is tuned to the one of the radio stations.

The above and other advantages of the present invention are carried out in another form by a method of attenuating interference in a remote audience survey system configured to identify radio stations to which tuners are tuned. The tuners have local oscillator (LO) signals emitted therefrom and the system includes a first antenna and a second antenna. The method calls for sensing a first signal in a detection zone of the first antenna, the first signal including one of the LO signals and an interference signal. The method further calls for receiving a second signal at the second antenna, the second antenna being shielded from receiving the one of the LO signals. A phase shift component is provided to the second signal to substantially cancel a phase difference between the second signal and the interference signal within the first signal. An amplitude component is applied to the second signal to substantially cancel an amplitude difference between the second signal and the interference signal within the first signal. The first and second signals are subtractively combined to produce a third signal, the interference signal being attenuated from the third signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a tuning table maintained in a memory structure within a controller portion of the interference attenuating remote audience survey system of FIG. 3;

FIG. 8 shows an exemplary format for a call record logged by the controller portion of the interference attenuating remote audience survey system of FIG. 3.

DETAILED DESCRIPTION OF THE PREFERRED EMBODIMENTS

Figure 1:
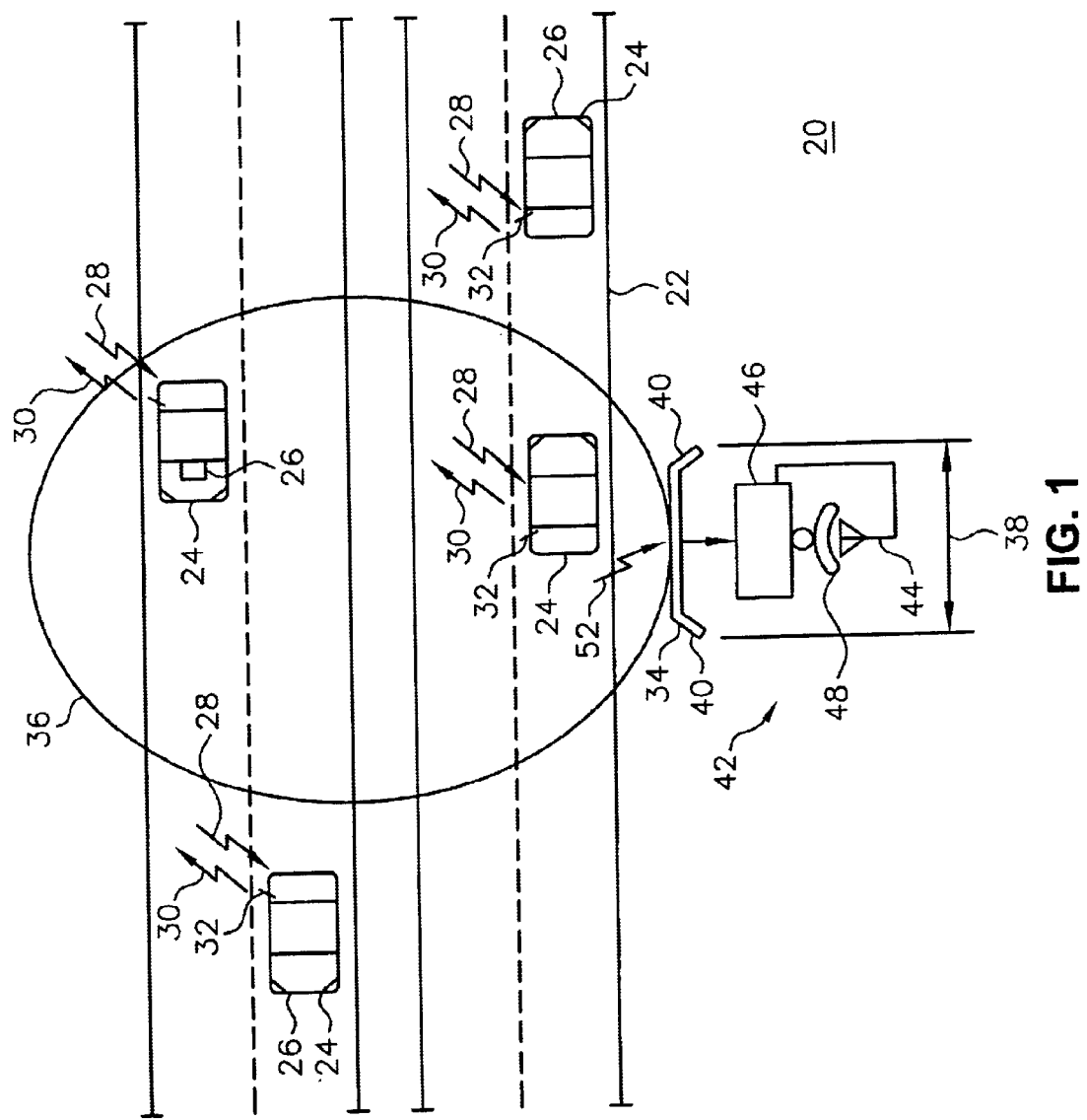
FIG. 1 shows a layout diagram of an example environment within which a preferred embodiment of the present invention may operate.

FIG. 1 shows a layout diagram of an example environment 20 within which a preferred embodiment of the present invention may operate. Environment 20 includes a road 22 on which any number of radio-equipped vehicles 24, such as cars, trucks, motorcycles, and the like, may travel in either of two directions.

Many of vehicles 24 include a radio or tuner 26 for receiving commercially broadcast radio or other signals, such as conventional AM, FM, television, and the like. For purposes of the following description, radios and tuners are synonymous including all of the components thereof, such as antennas, loudspeakers, and the like. Tuners 26 detect RF broadcast signals, or radio broadcast signals 28, through a well known demodulation process which requires tuners 26 to generate predetermined signals, such as local oscillator (LO) signals 30 related to radio broadcast signals 28 for radio stations. LO signals 30 are very weak signals which are emitted from tuners 26 primarily by vehicle antennas 32 coupled to tuners 26.

For the conventional FM band standard used in the United States and elsewhere, each of LO signals 30 oscillate at a fundamental frequency around 10.7 MHz above the frequency of radio broadcast signal 28 for a radio station to which a tuner 26 is currently tuned. In other words, since the FM band for radio broadcast signals 28 is 88.1–107.9 MHz, LO signals 30 are exhibit even tenth-MHz fundamental frequencies in the band of 98.8–118.6 MHz.

The currently preferred embodiment of the present invention identifies the FM radio stations to which some of tuners 26 may be tuned by detecting LO signals 30. However, those skilled in the art will appreciate that many features of the present invention may be successfully applied to identifying AM, L-band, television stations, and so forth, either alone or in combination with the detection of FM stations. Moreover, the predetermined signals need not be local oscillator signals 30 generated by tuners 26, but may be any predetermined signal generated or echoed by associated elements of tuners 26, including antennas, or loudspeakers, that can be related to radio broadcast signals 28.

The present invention uses an antenna 34 to establish a detection zone 36 within which LO signals 30 emitted from vehicles 24 may be received. In exemplary environment 20, detection zone 36 extends across road 22 to cover traffic lanes for two directions.

In a preferred embodiment, antenna 34 is a half wave dipole antenna. Antenna 34 exhibits a longitudinal dimension 38 along its axis and is mounted horizontally relative to road 22 so that longitudinal dimension is approximately parallel to road 22. Typically, half wave dipole antennas are one-half of the operating wavelength long and center-fed so as to have equal current distribution in both halves. In the preferred embodiment of the present invention, distal ends 40 of antenna 34 are partially folded, or bent. This bent configuration of antenna 34 results in longitudinal dimension 38 being shortened, relative to conventional straight dipole antennas, thus achieving space savings without significant loss of gain. Antenna 34 is a high gain antenna particularly suited to detecting weak LO signals 30 within detection zone 36.

Antenna 34 forms part of an interference attenuating remote audience survey system 42. System 42 generally includes antenna 34, referred to hereinafter as first antenna 34, as discussed above. System 42 also includes a second antenna 44, and electronic survey equipment 46. A ferrous shield 48 is located between second antenna 44 and detection zone 36. Ferrous shield 48 substantially prevents second antenna 44 from receiving LO signals 30 emitted in detection zone 36.

Figure 2:
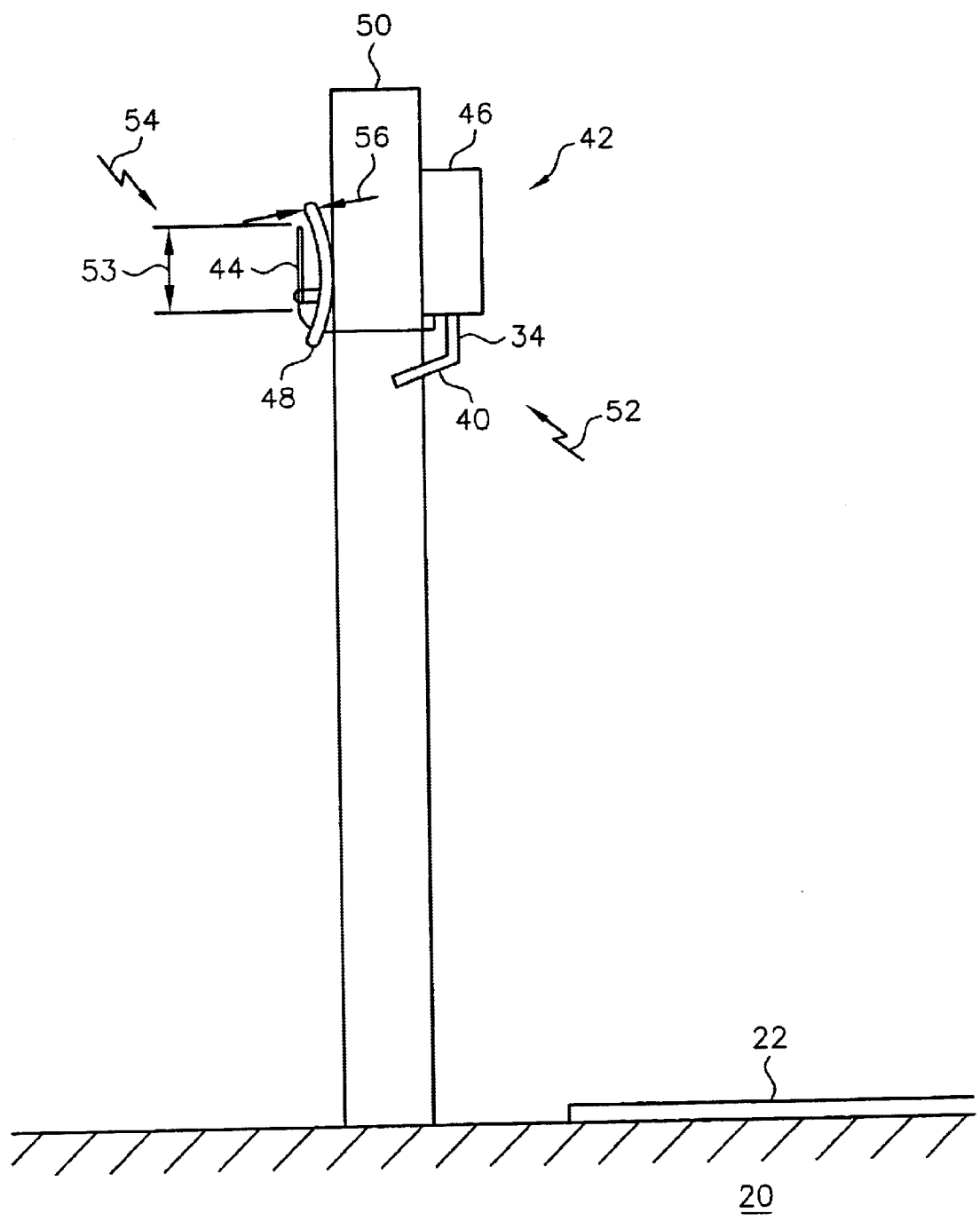
FIG. 2 shows a layout diagram of an interference attenuating remote audience survey system in accordance with a preferred embodiment of the present invention.

Referring to FIG. 2 in connection with FIG. 1, FIG. 2 shows a layout diagram of interference attenuating remote audience survey system 42 in an exemplary mounting configuration. In the exemplary mounting configuration, system 42 is mounted on a pole 50 beside road 22. Alternatively, system 42 may be mounted above road 22 or on a median within road 22.

First antenna 34 is oriented on pole 50 such that longitudinal dimension 38 (see FIG. 1) is approximately horizontal to and parallel to road 22. First antenna 34 faces road 22, and is configured to sense a first signal 52 in detection zone 36. In contrast, second antenna 44 is mounted to pole 50 on a side opposite from, but proximate to, first antenna 34. Ferrous shield 48 is mounted between pole 50 and second antenna 44.

In a preferred embodiment, second antenna 44 is a one quarter wave whip antenna. Second antenna 44 is a generally flexible rod antenna having a longitudinal dimension 53 along its longitudinal axis that is shorter than said longitudinal dimension 38 of first antenna 34. Second antenna 44 is low gain relative to first antenna 34. Second antenna 44 is located proximate first antenna 34 and is arranged such that longitudinal dimension 53 of second antenna 44 is approximately perpendicular to longitudinal dimension 38 of first antenna 34. That is, second antenna 44 is positioned approximately parallel to pole 50 in an inconspicuous orientation to achieve compact size. Second antenna 44 is configured to receive a second signal 54. Although first antenna 34 is described herein as a half wave dipole antenna and second antenna 44 is described herein as a one quarter wave whip antenna, it should be understood that other antennas that are dissimilar with respect to each other may be used.

Ferrous shield 48 is a low resistance, electric current conducting material that contains iron. Therefore, ferrous shield 48 prevents electric fields from being sustained and prevents electromagnetic waves from penetrating deeply which prevents their transmission through ferrous shield 48. Thus, ferrous shield 48 is positioned between second antenna 44 and pole 50 and has a predetermined thickness 56 for substantially preventing first signal 52, propagating from detection zone 36, to penetrate through ferrous shield 48. In a preferred embodiment, shield 48 is formed from a ferrous material. However, those skilled in the art will recognize that other materials may be employed for shielding second antenna 44 from receiving first signal 52.

Figure 3:
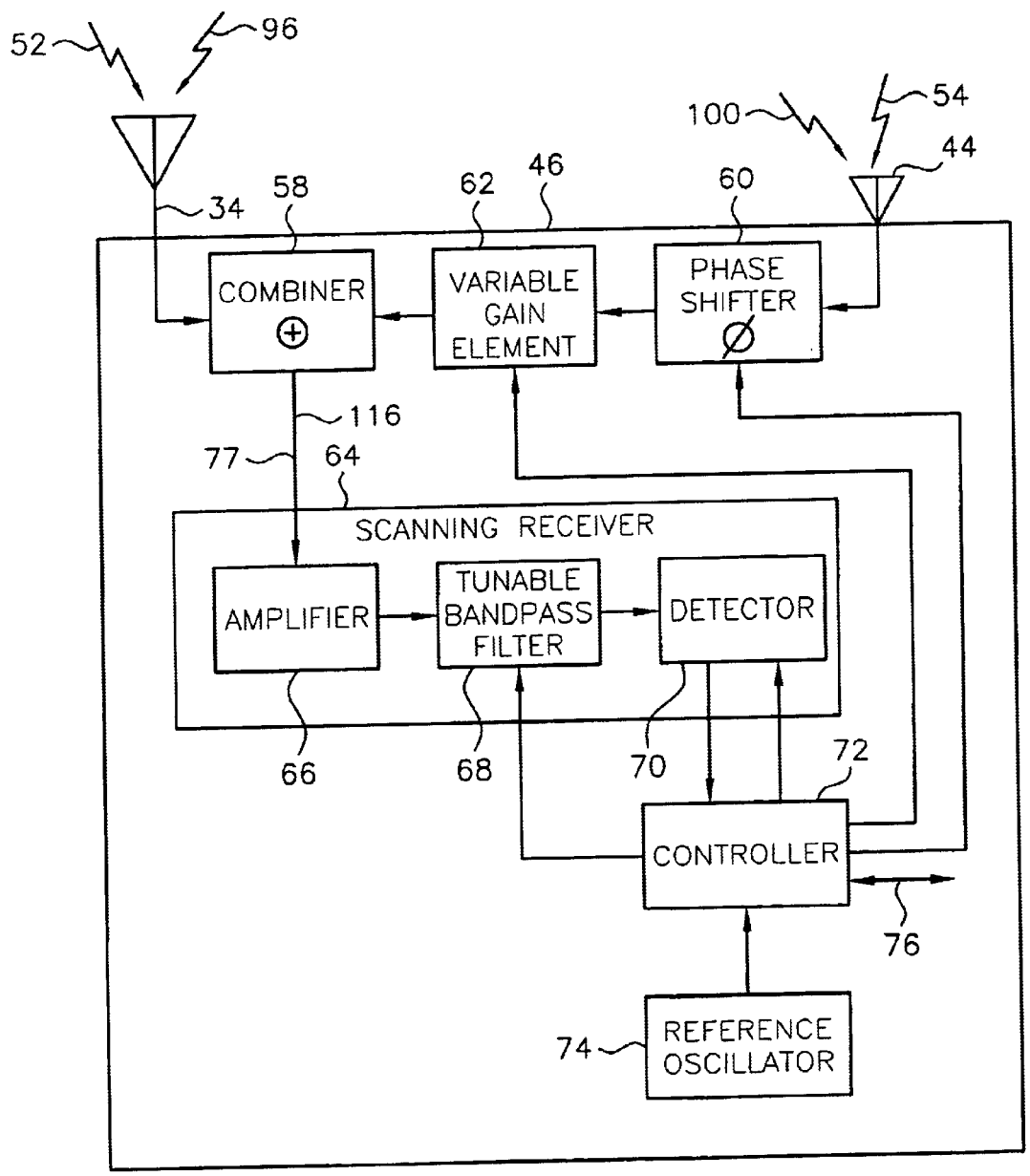
FIG. 3 shows a block diagram of the interference attenuating remote audience survey system.

FIG. 3 shows a block diagram of interference attenuating remote audience survey system 42. First antenna 34 is coupled to an input of a combiner 58 of electronic survey equipment 46. In a preferred embodiment of the present invention, second antenna 44 is coupled to an input of a phase shifter 60 of electronic survey equipment 46. An output of phase shifter 60 couples to an input of a variable gain element, i.e., an amplifier 62. An output of amplifier 62 subsequently couples to an input of combiner 58. An output of combiner 58 is in communication with a signal input of an scanning receiver 64.

Scanning receiver 64 generally includes an amplifier 66 which is fed from combiner 58. An output of amplifier 66 couples to a signal input of a tunable bandpass filter 68, and an output of filter 68 couples to a signal input of a detector 70. A signal output of detector 70 couples to an input of a controller 72. Control outputs of controller 72 couple to control inputs of phase shifter 60, variable gain amplifier 62, tunable bandpass filter 68, and detector 70.

Tunable bandpass filter 68 has an RF-range center frequency specified by controller 72 and is configured to be tuned to receive LO signals 30 (FIG. 1) within the band of 98.8–118.6 MHz. Alternatively, filter 68 may be configured to be tuned to receive second and/or third harmonics of a fundamental frequency of LO signals 30. Thus, tunable bandpass filter 68 may be tuned to receive second harmonics within the band of 197.6–237.2 MHz. Likewise, filter 68 may be tuned to receive third harmonics within the band of 296.4–355.8 MHz.

A reference oscillator 74 provides a stable frequency reference. In the embodiment depicted in FIG. 3, reference oscillator 74, or a signal derived from oscillator 74, serves as a clock signal for controller 72. Detector 70 amplifies and rectifies its input signal. In addition, detector 70 compares the resulting input signal to a threshold value supplied by controller 72. A sensed LO signal 30 causes this threshold to be exceeded.

Controller 72 may be implemented using conventional microprocessor and microcontroller circuits and related peripherals well known to those skilled in the art. Such circuits and peripherals include non-volatile and volatile memory (not shown) within which a computer program is stored and within which variables, tables, lists, and databases manipulated by the computer program are stored. A communications port 76 of controller 70 provides a way to enter and extract data from controller 72. Port 76 may be provided by a disk drive, modem, cellular or land-line communications link, and the like.

The signal strength of LO signals 30 (FIG. 1) may vary significantly from vehicle 24 to vehicle 24. In addition, the background electronic noise, or interference, may be greater on LO signals 30 at some local oscillator (LO) frequencies than on LO signals 30 at other LO frequencies. The variance of signal strength and the imposition of interference between LO signals 30 can result in survey errors when detecting LO signals 30 within first signal 52 in detection zone 36.

The present invention mitigates the problems associated with detecting LO signals 30 in a noisy environment and/or from tuners 26 emitting particularly weak ones of LO signals 30 by initially attenuating interference in first signal 52 detected in detection zone 36. The interference is attenuated by subtractively combining first signal 52 and second signal 54 at combiner 58 to obtain a resultant signal, or a third signal 77, in which the interference is attenuated. Following the attenuation of some of the interference, system 42 then attempts to detect the presence of one of LO signals 30 in third signal 77 in order to identify radio stations to which tuners 26 are tuned.

Figure 4:
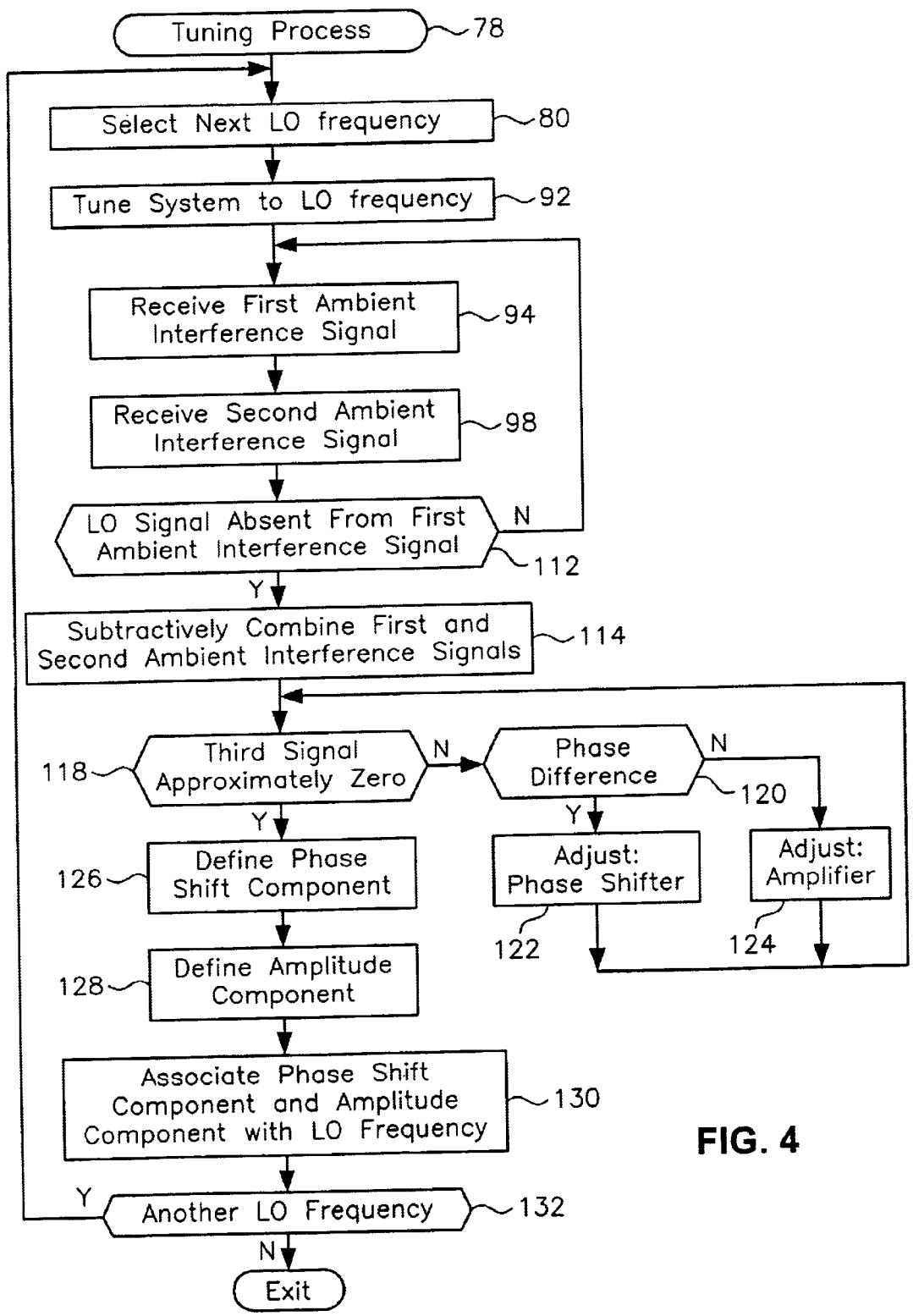
FIG. 4 shows a tuning process performed by the interference attenuating remote audience survey system of FIG. 3.

FIG. 4 shows a tuning process 78 performed by the interference attenuating remote audience survey system 42 (FIG. 3). Tuning process 78 is desirably executed for detection zone 36 (FIG. 1) when system 42 (FIG. 3) is first installed along road 22 (FIG. 1) and periodically repeated. Process 78 is defined by a computer program stored in and executed by controller 72 (FIG. 3). Tuning process 78 may be initiated remotely through, for example, the receipt of instructions via communications port 76 (FIG. 3).

Tuning process 78 is performed to detect ambient interference (discussed below) around system 42 at each of first and second antennas 34 and 44, respectively. The detected interference is employed set a phase shift component (discussed below) for phase shifter 60 (FIG. 3) and an amplitude component (discussed below) for variable gain amplifier 62 (FIG. 3) at each of the LO frequencies of LO signals 30 (FIG. 1). In other words, process 78 is performed to substantially equalize the response of system 42 when only interference signals (discussed below) are detected at each of first and second antennas 34 and 44, respectively, so that when the interference signals are subtractively combined at combiner 58 (FIG. 3), the signals will substantially cancel each other.

Tuning process 78 begins with a task 80. Task 80 selects a next local oscillator frequency. Task 80 may consult a table when selecting the next local oscillator frequency. Referring to FIG. 5 in connection with task 80, FIG. 5 shows a tuning table 82 which is maintained in a memory structure (not shown) within controller 72 (FIG. 3) of interference attenuating remote audience survey system 42 (FIG. 3). Tuning table 82 is a database assembled for detection zone 36 (FIG. 1) and is completed during the execution of tuning process 78 (FIG. 5).

Table 82 depicts an exemplary memory structure which associates radio stations 84, identified by their call letters, with their related station frequencies 86, and with their related LO signals 30. For clarity of illustration, LO signals 30 are identified in table 82 by their local oscillator (LO) frequencies 88. Tuning table 82 may include any number of radio stations 84, as indicated by ellipses 90. However, table 82 is constructed to include only LO frequencies 88 associated with radio stations 84 which may be included in an audience survey prepared by system 42 (FIG. 3). Tuning table 82 also includes a phase shift component 91 and an amplitude component 93 which are determined for each of LO frequencies 88 during the further execution of process 78. Phase shift component 91 and amplitude component 93 are discussed in further detail below.

With reference to FIGS. 4 and 5, task 80 may move a pointer (not shown) to a next entry in table 82 to select the next one of LO frequencies 88.

A task 92 is performed in response to task 80. Task 92 tunes scanning receiver 64 (FIG. 3) to enable detection of signals exhibiting LO frequency 88. That is, controller 72

(FIG. 3) conveys a control signal to tunable bandpass filter 68 of scanning receiver 64 to tune to the selected one of LO frequencies 88. For example, controller 72 may instruct tunable bandpass filter 68 to tune to LO frequency 88 of 98.8 MHz.

A task 94 is performed following task 92. At task 94, a first ambient interference signal 96 (see FIG. 3) is received at first antenna 34.

A task 98 is performed in combination with task 94. At task 98, a second ambient interference signal 100 (see FIG. 3) is received at second antenna 44.

Tasks 94 and 98 are performed to detect the ambient interference, or RF energy, exhibiting a particular frequency, i.e., the selected one of LO frequencies 88, that is currently detectable at system 42. First and second ambient interference signals 96 and 100 generally represent the same ambient interference. Thus, first and second interference signals 96 and 100 may be similar, but need not be equal in phase and/or amplitude.

Figure 6:
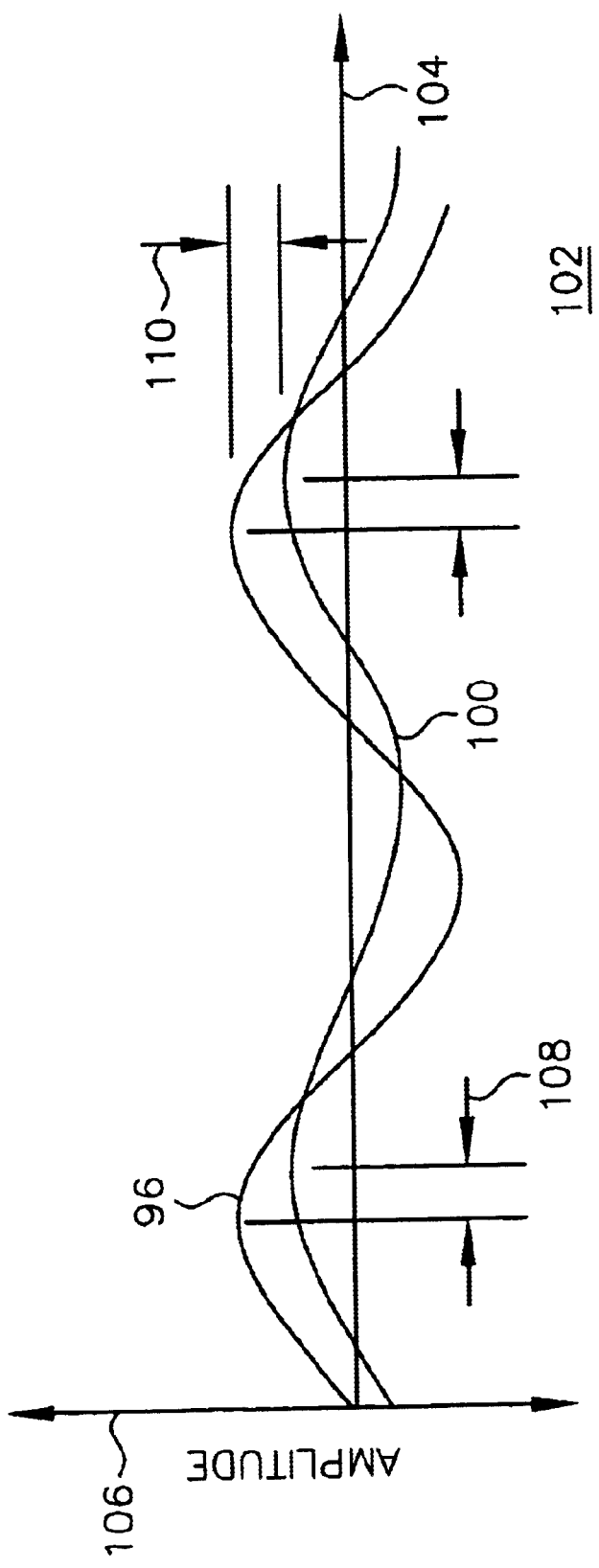
FIG. 6 shows an exemplary graph of first and second ambient interference signals received during the execution of the tuning process of FIG. 4.

FIG. 6 shows a simplified exemplary graph 102 of first and second ambient interference signals 96 and 100, respectively, received during the execution of tasks 94 and 98 of tuning process 78 (FIG. 4). Graph 102 shows first and second signals 96 and 100 in terms of time 104 versus amplitude 106. Graph 102 also shows a phase difference 108 and an amplitude difference 110 between first and second signals 96 and 100, respectively. Phase difference 108 is the time or the angle by which second ambient interference signal 100 leads or lags first ambient interference signal 96. Likewise, amplitude difference 110 is the amplitude value by which a signal strength of second ambient interference signal 100 differs from the signal strength of first ambient signal 96.

First and second ambient interference signals 96 and 100 are received so that phase shifter 60 (FIG. 3) and variable gain amplifier 62 (FIG. 3) may be adjusted until phase difference 108 and amplitude difference 110 approach zero. As such, when first and second ambient interference signals 96 and 100 are subtractively combined at combiner 58 (FIG. 3), they will substantially cancel each other.

Referring back to process 78 (FIG. 4), a query task 112 is performed in response to tasks 94 and 98. Query task 112 determines if LO signals 30 exhibiting the selected one of LO frequencies 88 are absent from first ambient interference signal 96 (FIG. 6). First and second ambient interference signals 96 and 100 are utilized to set phase shift component 91 (FIG. 5) for phase shifter 60 (FIG. 3) and amplitude component 93 (FIG. 5) for variable gain amplifier 62. Accordingly, it is highly desirable that there are no tuners 26 (FIG. 1) in detection zone 36 (FIG. 1) currently emitting LO signals 30 exhibiting the selected one of LO frequencies 88. System 42 may perform query task 112 by detecting signal characteristics indicative of one of LO signals 30 being emitted from one of tuners 26, such as ramping up and decay of the signal strength of one of LO signals 30 within first interference signal 96, or a detection duration of one of LO signals 30 within first interference signal 96.

When query task 112 determines that one of LO signals 30 at the selected one of LO frequencies 88 is present within first ambient interference signal 96, program control loops back to task 94 to continue receiving first and second ambient interference signals 96 and 100, respectively, until one of LO signals 30 being emitted from one of tuners 26 (FIG. 1) is no longer detected.

However, when query task 112 determines that one of LO signals 30 at the selected one of LO frequencies 88 is absent from first ambient interference signal 96, process 78 proceeds to a task 114.

At task 114, first and second ambient interference signals 96 and 100 are subtractively combined at combiner 58 (FIG. 3). The execution of task 114 produces a resultant signal, i.e., a third signal 116 (see FIG. 3) to be output from combiner 58.

Following task 114, a query task 118 determines if third signal 116 is approximately zero. That is, query task 118 determines if first and second ambient interference signals 96 and 100, respectively, substantially cancel each other when subtractively combined at task 114. When query task 118 determines that third signal 116 is not approximately zero, process 78 proceeds to a query task 120.

Query task 120 determines if phase difference 108 is minimized between first and second ambient interference signals 96 and 100, respectively. Phase difference 108 between first and second ambient interference signals 96 and 100 may occur as a result of the impedance characteristics of first and second antennas 34 and 44, respectively, and as a result of signal gain or attenuation differences as each of first and second signals 96 and 100 propagate to combiner 58 (FIG. 3). When a non-minimum phase difference 108 is ascertained at query task 120, process 78 proceeds to a task 122.

Task 122 adjusts phase shift component 91 (FIG. 5) via control signals from controller 72 (FIG. 3). Phase shift component 91 is a voltage, provided by phase shifter 60, that when imposed upon second ambient interference signal 100, changes the phase relation between first and second ambient interference signals 96 and 100, respectively. Thus, phase shift component 91 is adjusted until phase difference 108 is minimized. Following task 122, program control loops back to query task 118 to determine if third signal 116 is approximately zero.

When query task 120 ascertains that phase difference 108 (FIG. 6) between first and second ambient interference signals 96 and 100, respectively, is minimized, process 78 proceeds to a task 124.

Task 124 adjusts amplitude component 93 (FIG. 5) via control signals from controller 72 (FIG. 3). Amplitude component 93 is a voltage, provided by variable gain amplifier 62 (FIG. 3), that when imposed upon second ambient interference signal 100, changes the amplitude relation between first and second ambient interference signals 96 and 100, respectively. Thus, amplitude component 93 is desirably adjusted until amplitude difference 110 (FIG. 6) is minimized.

Following task 124, program control again loops back to query task 118 to determine if third signal 116 is approximately zero. The iterative process of tasks 118, 120, 122, and 124 is performed until third signal 116 best represents a cancellation of first and second ambient interference signals 96 and 100, when first and second signals 96 and 100 are subtractively combined.

When query task 118 determines that third signal 116 is approximately zero, process 78 proceeds to a task 126. Task 126 defines the value of phase shift component 91 (FIG. 5) that was imposed on second signal 100, to best eliminate phase difference 108.

A task 128 is performed in connection with task 126. Task 128 defines the value of amplitude component 93 (FIG. 5) that was imposed on second signal 100, to most nearly eliminate amplitude difference 110.

A task 130 is performed following task 128. Task 130 associates phase shift component 91 and amplitude component 93 with the selected one of LO frequencies 88 (FIG. 5). Referring to FIG. 5 in connection with task 130, table 82 shows a selected one of LO frequencies 88, of 98.8 MHz, having associated therewith, a phase shift component 91, of "x", and an amplitude component 93, of "y".

With reference back to FIG. 4, following task 130, a query task 132 is performed. Query task 132 determines if there is another one of LO frequencies 88 for which process 78 is to be performed. When there is another one of LO frequencies 88, program control loops back to task 80 to select the next one of LO frequencies 88 from tuning table 82 (FIG. 5). However, when tuning process 78 has been executed for each of LO frequencies 88 in tuning table 82, process 78 exits with phase shift component 91 (FIG. 5) and amplitude component 93 (FIG. 5) defined for each of LO frequencies 88 (FIG. 5).

Ambient interference, or background noise, changes in response to time of day, weather, traffic levels, and so forth. Accordingly, tuning process 78 may be performed as often as needed to accommodate the changing interference levels.

Figure 7:
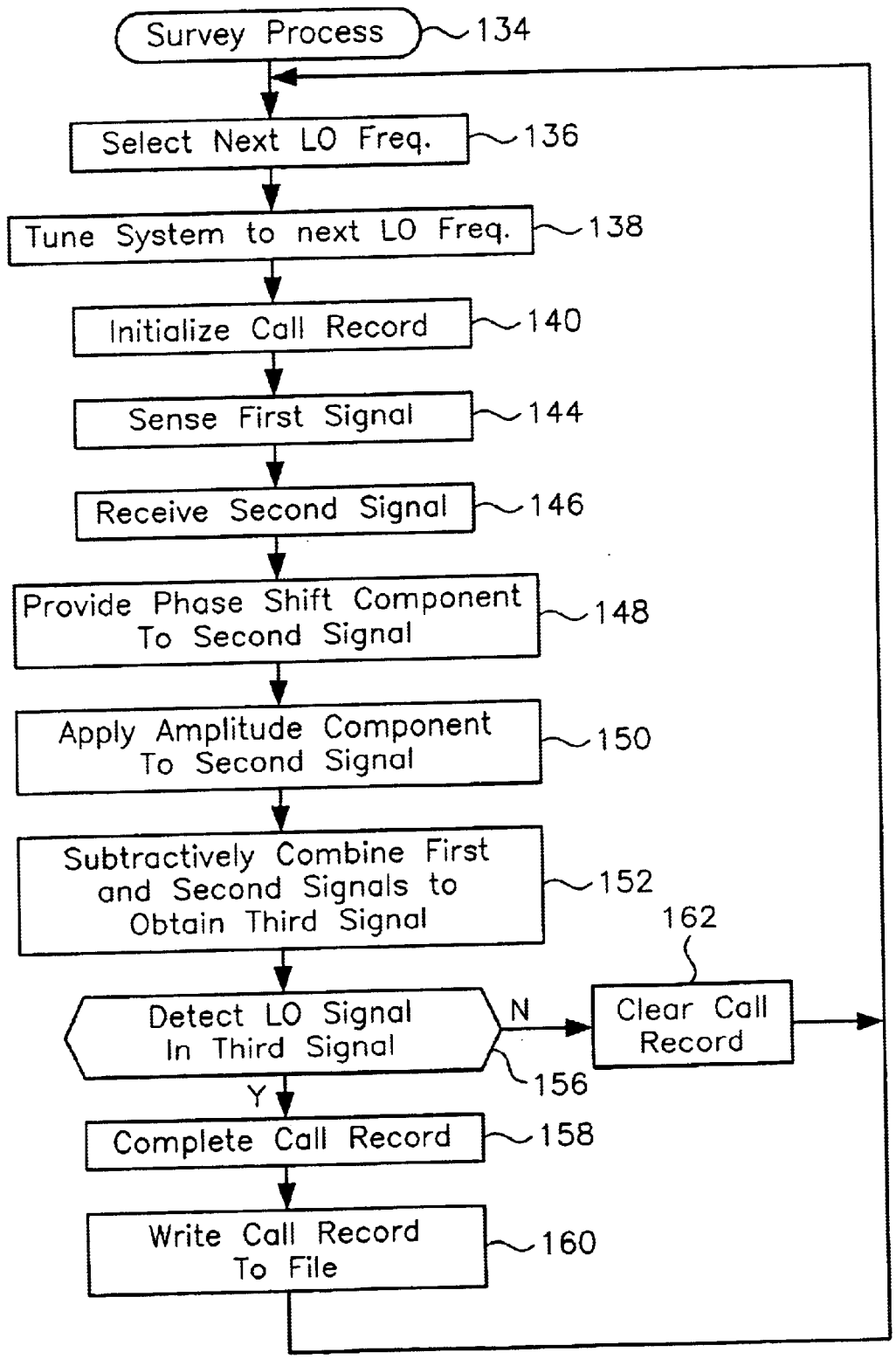
FIG. 7 shows a survey process performed by the interference attenuating remote audience survey system of FIG. 3.

FIG. 7 shows a survey process 134 performed by interference attenuating remote audience survey system 42 (FIG. 3). Process 134 is executed to identify radio stations 84 (FIG. 5) to which tuners 26 (FIG. 1) are tuned. Process 134 is defined by a computer program stored in and executed by controller 72 (FIG. 3). Generally, process 134 operates continuously in a loop to obtain data which are then communicated through port 76 (FIG. 3) and further processed in a conventional manner to form an audience survey.

Process 134 begins with a task 136 which selects a next one of local oscillator frequencies 88 (FIG. 5) of one of LO signals 30 (FIG. 1). Task 134 desirably consults tuning table 82 (FIG. 5) when selecting next local oscillator frequency 88. Task 136 may move a pointer (not shown) to a next entry in tuning table 82 to select the next one of LO frequencies 88. When the pointer reaches the end of table 82 it may return to the beginning of table 82.

A task 138 is performed in connection with task 136. Task 138 tunes system 42 to the next one of LO frequencies 88. Referring to FIG. 5 in connection with task 138, controller 72 (FIG. 3) conveys a control signal to tunable bandpass filter 68 (FIG. 3) of scanning receiver section 64 (FIG. 3) to set a center frequency corresponding to the selected one of LO frequencies 88. In addition, controller 72 conveys control signals to set phase shift component 91 of phase shifter 60 (FIG. 3) and to set amplitude component 93 of variable gain amplifier (FIG. 3). For example, when the selected one of LO frequencies 88 is 98.8 MHz, phase shift component 91 is set to "x" and amplitude component 93 is set to "y". Those skilled in the art will recognize that tuning task 138 may also tune a gain of amplifier 66 and/or set a detection threshold for detector 70 specific to the selected one of LO frequencies 88.

Following task 138, a task 140 is performed to initialize a call, or survey, record 142 in a memory section (not shown) of controller 72 (FIG. 3) for the selected one of LO frequencies 88. FIG. 8 shows an exemplary format for call record 142 logged by controller 72 of interference attenuating remote audience survey system 42 (FIG. 3). Call, or survey, record 142, includes data relevant to the detection of one of radio stations 84 (FIG. 5) to which one of tuners 26 (FIG. 1) may be tuned. Task 140 may for example, write data to call record 142 that describe a serial number for the call, station frequency 86, various descriptive data, such as station call letters, LO frequency 88, current date, and current time of day. The current time of day identifies the starting time of the call. These data represent parameters that identify a particular one of LO signals 30 currently being monitored for within detection zone 36 (FIG. 1).

Call record 142 will be completed through the further execution of process 134 (FIG. 7) and saved in a memory structure (not shown) of controller 72 (FIG. 3) if one of tuners 26 is tuned to one of radio stations 84 associated with the selected one of LO frequencies 88. If one of tuners 26 is not detected, call record 142 will not be completed.

Referring back to process 134 (FIG. 7), following initialization task 140, a task 144 is performed. Task 144 causes first antenna 34 (FIG. 3) of system 42 (FIG. 3) to be enabled to sense first signal 52 (FIG. 1). Task 140 may set a timer (not shown) for monitoring a duration of time during which first signal 52 may be sensed and evaluated for one of LO signals 30.

A task 146 is performed in combination with task 144. Task 146 causes second antenna 44 (FIG. 3) of system 42 (FIG. 3) to be enabled to receive second signal 54 (FIG. 1). Task 146 may set a timer (not shown) for monitoring a duration of time during which second signal 54 may be received.

In a preferred embodiment, first signal 52 may include one of LO signals 30 corresponding to the selected one of LO frequencies 88 (FIG. 5) and an interference signal, for example first ambient interference signal 96 (FIG. 6). Since second antenna 44 is largely prevented from receiving one of LO signals 30 corresponding to the selected one of LO frequencies 88 emitted from within said detection zone 36, second signal 54 is predominately an interference signal, for example, second ambient interference signal 100 (FIG. 6). Of course, as discussed previously, first and second ambient interference signals 96 and 100, respectively, are similar but need not be identical in phase and/or amplitude to each other.

A task 148 is performed in response to receiving task 146. At task 148, phase shifter 60 (FIG. 3) provides phase shift component 91 (FIG. 5) to second signal 54. That is, phase shifter 60 imposes phase shift component 91 onto second signal 54 to attenuate phase difference 108 (FIG. 6) between first interference signal 96 within first signal 52 and second interference signal 100 within second signal 54.

Following task 148, a task 150 is performed. At task 150, variable gain amplifier 62 (FIG. 3) applies amplitude component 93 (FIG. 5) to second signal 54. That is, variable gain amplifier 62 imposes amplitude component 93 onto second signal 54 to attenuate amplitude difference 110 (FIG. 6) between first interference signal 96 within first signal 52 and second interference signal 100 within second signal 54.

Referring momentarily to FIG. 3, in a preferred embodiment, phase shifter 60 and variable gain element 62 are coupled between second antenna 44 and combiner 58 for imposing phase shift component 91 and amplitude component 93 on second signal 54. However, those skilled in the art will recognize that phase shifter 60 and/or variable gain element 62 may be coupled between first antenna 34 and combiner 58. In such a configuration, task 148 would provide phase shift component 91 to first signal 52. That is, phase shifter 60 would impose phase shift component 91 onto first signal 52 to attenuate phase difference 108 between first interference signal 96 within first signal 52 and second interference signal 100 within second signal 54. Likewise, task 150 would apply amplitude component 93, in the form of attenuation, to first signal 52. That is, variable gain element 62 would impose amplitude component 93 onto first signal 52 to attenuate amplitude difference 110 between first interference signal 96 within first signal 52 and second interference signal 100 within second signal 54.

Referring back to FIG. 7, following task 150, a task 152 is performed to subtractively combine first and second signals 52 and 54 at combiner 58 (FIG. 3) to produce third signal 77 (FIG. 3). Third signal 77 is differentiated from third signal 116 in that third signal 116, produced through the execution of tuning process 78 (FIG. 4), is desirably nearly a null signal. In contrast, third signal 77, produced through the execution of survey process 134, may include one of LO signals 30 emitted from one of tuners 26 (FIG. 1) in detection zone 36 (FIG. 1). Combiner 58 subtractively combines first and second signals 52 and 54, respectively, so that interference is attenuated from third signal 77. By attenuating some or all of the interference in third signal 77, one of LO signals 30 may be more likely to be detected at scanning receiver 64 (FIG. 3). In addition, the detection range of system 42, i.e., the effective size of detection zone 36, increases and more detections may be recorded without diminishing data accuracy by attenuating some of the interference in third signal 77.

Following task 152, third signal 77 is output from combiner 58 and input at scanning receiver 64 (FIG. 3) and a query task 156 is performed. Query task 156 determines if one of LO signals 30 exhibiting the selected one of LO frequencies 88 (FIG. 5) is detected within third signal 77. In making this determination, query task 156 may desirably evaluate a signal strength parameter, a signal-to-noise ratio, or a combination of factors describing third signal 77 to reduce the likelihood of confusing a spurious signal with a legitimate call. When query task 156 determines that one of LO signals 30 is detected, program control proceeds to a task 158.

Task 158 completes call record 142 (FIG. 8) initialized above in task 140. Task 158 may add data describing a stop time, signal strength, and other factors to call record 142.

A task 160 is performed in connection with task 158. Task 160 writes call record 142 (FIG. 8) to memory so that it may later be communicated to a processing center (not shown) for compilation into a survey results report. In other words, task 160 records the detection of one of tuners 26 (FIG. 1) tuned to one of the surveyed radio broadcast signals 28 (FIG. 1) through the detection of LO signal 30 within third signal 77.

After task 160, program control loops back to task 136 to repeat process 134 at another one of LO frequencies 88. In a preferred embodiment, each selected one of LO frequencies 88 may be evaluated in less than a few milliseconds. Accordingly, all of LO frequencies 88 listed in table 82 (FIG. 5) may be evaluated in less time than a vehicle 24 (FIG. 1) typically spends in detection zone 36 (FIG. 1).

When query task 156 determines that one of LO signals 30 is not detected within third signal 77, process 134 proceeds to a task 162. Task 162 clears call record 142, initialized in task 140, and program control loops back to task 136 to repeat process 134 at another one of LO frequencies 88. In other words, no tuners 26 in detection zone 36 (FIG. 1) are currently tuned to the one of radio broadcast signals 28 (FIG. 1) associated with the selected one of LO frequencies 88.

In summary, the present invention provides an interference attenuating remote audience survey system and method. The interference attenuating survey system identifies RF broadcast stations related to selected ones of local oscillator signals. Improved accuracy of audience survey data is achieved by improving on the ability of the system to detect audience survey data through the attenuation of interference. The ambient interference is at least partially attenuated from a signal received from within the detection zone so that the interference does not mask the detection of a local oscillator signal. Through the attenuation of interference, the detection range of the system is increased without diminishing data accuracy. The system employs dissimilar antennas located close to one another, and with one substantially smaller than the other so that present invention achieves a compact size through an efficient configuration.

Although the preferred embodiments of the invention have been illustrated and described in detail, it will be readily apparent to those skilled in the art that various modifications may be made therein without departing from the spirit of the invention or from the scope of the appended claims. For example, different antennas may be employed than those described above. In addition, those skilled in the art can distribute the processing functions described herein between a receiver and controller differently than indicated herein, or those skilled in the art can combine functions which are indicated herein as being performed at different components of the system. Furthermore, those skilled in the art will appreciate that the present invention will accommodate a wide variation in the specific tasks and the specific task ordering used to accomplish the processes described herein.

What is claimed is:

1. An interference attenuating remote audience survey system for identifying radio stations to which tuners are tuned, said tuners having local oscillator (LO) signals emitted therefrom, and said system comprising:

a controller configured to select one of said LO signals associated with one of said radio stations;

a first antenna for sensing a first signal in a detection zone of said first antenna, said first signal including said one of said LO signals and an interference signal;

a second antenna for receiving a second signal, said second signal including said interference signal;

a shield element positioned between said second antenna and said detection zone for shielding said second antenna from receiving said one of said LO signals;

a combiner in communication with each of said first and second antennas, said combiner subtractively combining said first and second signals to produce a third signal, said interference signal being attenuated from said third signal;

a receiver in communication with said combiner and said controller, said receiver being configured to detect said selected one of said LO signals within said third signal to determine that one of said tuners is tuned to said one of said radio stations; and a phase shifter in communication with said combiner for providing a phase shift component to one of said first and second signals to substantially cancel a phase difference between said second signal and said interference signal within said first signal.

2. An interference attenuating remote audience survey system as claimed in claim 1 wherein:

said phase shift component is associated with said selected one of said LO signals; and said controller is in communication with said phase shifter for providing said phase shift component in response to said selected one of said LO signals.

3. An interference attenuating remote audience survey system as claimed in claim 1 further comprising an amplifier in communication with said combiner for applying an amplitude component to one of said first and second signals to substantially cancel an amplitude difference between said second signal and said interference within said first signal.

4. An interference attenuating remote audience survey system as claimed in claim 3 wherein: said amplitude component is associated with said selected one of said LO signals; and said controller is in communication with said amplifier for providing said amplitude component in response to said selected one of said LO signals.

5. An interference attenuating remote audience survey system as claimed in claim 1 wherein:
said first antenna exhibits a first antenna gain; and said second antenna exhibits a second antenna gain, said second antenna gain being less than said first antenna gain.

6. An interference attenuating remote audience survey system as claimed in claim 1 wherein:
said first antenna exhibits a first longitudinal dimension; and said second antenna exhibits a second longitudinal dimension, said second longitudinal dimension being less than said first longitudinal dimension.

7. An interference attenuating remote audience survey system as claimed in claim 1 wherein:
said first antenna is a half wave dipole antenna; and said second antenna is a one quarter wave whip antenna.

8. An interference attenuating remote audience survey system as claimed in claim 1 wherein said shield element is a ferrous shield having a predetermined thickness that substantially prevents said first signal, propagating from said detection zone, to penetrate through said ferrous shield.

9. In a remote audience survey system configured to identify radio stations to which tuners are tuned, said tuners having local oscillator (LO) signals emitted therefrom, and said system including a first antenna and a second antenna, a method of attenuating interference comprising:
sensing a first signal in a detection zone of said first antenna, said first signal including one of said LO signals and an interference signal;
receiving a second signal at said second antenna, said second antenna being shielded from receiving said one of said LO signals;
providing a phase shift component to one of said first and second signals to substantially cancel a phase difference between said second signal and said interference signal within said first signal;
applying an amplitude component to one of said first and second signals to substantially cancel an amplitude difference between said second signal and said interference signal within said first signal; and
subtractively combining said first and second signals to produce a third signal, said interference signal being attenuated from said third signal.

10. A method as claimed in claim 9 wherein prior to said sensing operation, said method further comprises:
a) tuning said system to a local oscillator (LO) frequency of said one of said LO signals;
b) receiving a first ambient interference signal at said first antenna;
c) receiving a second ambient interference signal at said second antenna, said first and second ambient interference signals exhibiting said LO frequency;
d) ascertaining said phase difference between said first and second ambient interference signals;
e) defining said phase shift component in response to said phase shift; and f) associating said phase shift component with said LO frequency in a database of said system.

11. A method as claimed in claim 10 wherein said method further comprises verifying an absence of said one of said LO signals within said first ambient interference signal prior to said operation d).

12. A method as claimed in claim 10 wherein said LO frequency is a one of a plurality of LO frequencies, and said method further comprises repeating said operations a)–f) to define distinct ones of said phase shift component for each of LO frequencies.

13. A method as claimed in claim 9 wherein prior to said sensing operation, said method further comprises:
a) tuning said system to a local oscillator (LO) frequency of said one of said LO signals;
b) receiving a first ambient interference signal at said first antenna;
c) receiving a second ambient interference signal at said second antenna, said first and second ambient interference signals exhibiting said LO frequency;
d) ascertaining said amplitude difference between said first and second ambient interference signals;
e) defining said amplitude component in response to said amplitude difference; and
f) associating said amplitude component with said frequency in a database of said system.

14. A method as claimed in claim 13 wherein said method further comprises verifying an absence of said one of said LO signals within said first ambient interference signal prior to said operation d).

15. A method as claimed in claim 13 wherein said LO frequency is a one of a plurality of LO frequencies, and said method further comprises repeating said operations a)–f) to define distinct ones of said amplitude component for each of LO frequencies.

16. A method as claimed in claim 9 further comprising:
selecting said one of said LO signals associated with one of said radio stations prior to said operation a); and detecting said one of said LO signals within said third signal to determine that one of said tuners is tuned to said one of said radio stations, between said second signal and said interference signal within said first signal.

17. An interference attenuating remote audience survey system for identifying radio stations to which tuners are tuned, said tuners having local oscillator (LO) signals emitted therefrom, and said system comprising: a controller configured to select one of said LO signals associated with one of said radio stations; a half wave dipole antenna for sensing a first signal in a detection zone of said first antenna, said first signal including said one of said LO signals and an interference signal; a one quarter wave whip antenna for receiving a second signal, said second signal including said interference signal; a shield element positioned between said second antenna and said detection zone for shielding said second antenna from receiving said one of said LO signals; a combiner in communication with each of said first and second antennas, said combiner subtractively combining said first and second signals to produce a third signal, said interference signal being attenuated from said third signal; and a receiver in communication with said combiner and said controller, said receiver being configured to detect said selected one of said LO signals within said third signal to determine that one of said tuners is tuned to said one of said radio stations; said system further comprising a phase shifter coupled between said one quarter wave whip antenna and said combiner for providing a phase shift component to said second signal to substantially cancel a phase difference id radio stations.

18. An interference attenuating remote audience survey system as claimed in claim 17 wherein:

said first antenna exhibits a first antenna gain; and said second antenna exhibits a second antenna gain, said second antenna gain being less than said first antenna gain.

19. An interference attenuating remote audience survey system as claimed in claim 17 wherein said shield element is a ferrous shield having a predetermined thickness that substantially prevents said first signal, propagating from said detection zone, to penetrate through said ferrous shield.

20. An interference attenuating remote audience survey system for identifying radio stations to which tuners are tuned, said tuners having local oscillator (LO) signals emitted therefrom, and said system comprising: a controller configured to select one of said LO signals associated with one of said radio stations; a half wave dipole antenna for sensing a first signal in a detection zone of said first antenna, said first signal including said one of said LO signals and an interference signal; a one quarter wave whip antenna for receiving a second signal, said second signal including said interference signal; a shield element positioned between said second antenna and said detection zone for shielding said second antenna from receiving said one of said LO signals; a combiner in communication with each of said first and second antennas, said combiner subtractively combining said first and second signals to produce a third signal, said interference signal being attenuated from said third signal; and a receiver in communication with said combiner and said controller, said receiver being configured to detect said selected one of said LO signals within said third signal to determine that one of said tuners is tuned to said one of said radio stations; said system further comprising an amplifier coupled between said one quarter wave whip antenna and said combiner for applying an amplitude component to said second signal to substantially cancel an amplitude difference between said second signal and said interference within said first signal.

21. An interference attenuating remote audience survey system as claimed in claim 20 wherein:

said first antenna exhibits a first antenna gain; and said second antenna exhibits a second antenna gain, said second antenna gain being less than said first antenna gain.

22. An interference attenuating remote audience survey system as claimed in claim 20 wherein said shield element is a ferrous shield having a predetermined thickness that substantially prevents said first signal, propagating from said detection zone, to penetrate through said ferrous shield.

* * * * *